6581X
J. J. Heriges.
Making Plug Tobacco.
Patented Jan. 13, 1831.
No. 1.
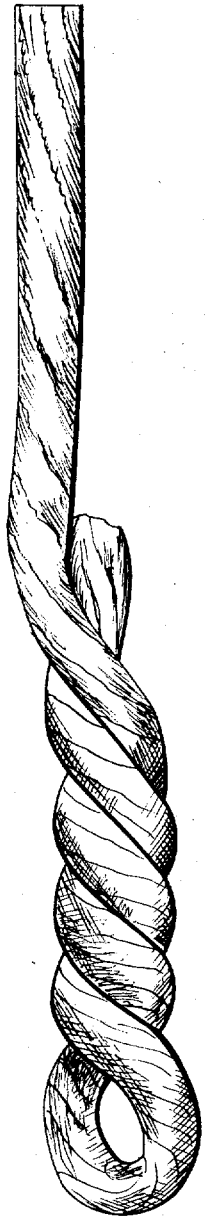
No. 2.
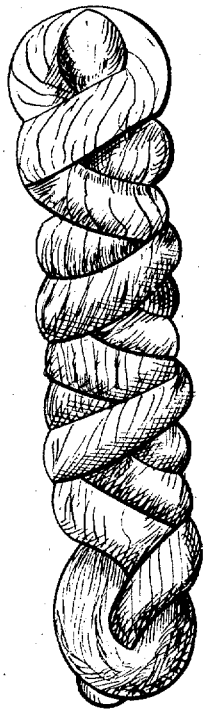
THE GRAPHIC CO. PHOTO-LITH. 39 & 41 PARK PLACE, N.Y.

6581X June 13. 1831

John J Herriges

The schedule referred to in these Letters Patent and making part of the same, containing a description in the words of the said John J. Herriges himself of his improvement in twisting penny plugs of Tobacco.

---

This invention consists in the mode of twisting the tobacco after it has been spun in the usual manner into great lengths, and is as follows to wit.

A piece of spun tobacco the size of what is denominated plug or pig-tail and generally a foot long more or less, is commenced at about four inches length to be twisted into two strands, in the twist, taking up about two thirds of the whole say eight inches, and leaving a continuation of one third more, in the length of one of the strands, which must be turned back upon the two twisted strands, and completely interwoven with them, embracing the end of the shortest strand between the second twisting of the two first strands, and now making three strands altogether, and the end of the last strand must also be inserted when the first twisting began, and between the two first strands to prevent its becoming loose and untwisted, which completes a firm compact roll or rope, and this being laid upon a board or table and rolled backward and forward by the hand partakes of a round and solid form which afterwards must go through the usual operations in packing and fermenting and is then fit to be chewed.

Exd. W.E.

Witness
Geo. H. Goodman
Jn^o. Goodman

John J. Herriges.

(27 words) Patented 13th June 1831.

Drawing